(12) United States Patent
Shibuki et al.

(10) Patent No.: US 9,303,541 B2
(45) Date of Patent: Apr. 5, 2016

(54) EXHAUST SYSTEM FOR MOTORCYCLE

(71) Applicant: HONDA MOTOR CO., LTD., Tokyo (JP)

(72) Inventors: Katsuaki Shibuki, Wako (JP); Masaya Yazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/556,565

(22) Filed: Dec. 1, 2014

(65) Prior Publication Data

US 2015/0152773 A1 Jun. 4, 2015

(30) Foreign Application Priority Data

Dec. 4, 2013 (JP) ................................. 2013-250895

(51) Int. Cl.
*F01N 1/08* (2006.01)
*F01N 3/10* (2006.01)
*F01N 3/28* (2006.01)
*F01N 3/08* (2006.01)

(52) U.S. Cl.
CPC .............. *F01N 1/089* (2013.01); *F01N 3/2882* (2013.01); *F01N 3/2885* (2013.01); *F01N 3/08* (2013.01); *F01N 3/10* (2013.01); *F01N 2260/06* (2013.01); *F01N 2330/04* (2013.01); *F01N 2340/00* (2013.01); *F01N 2490/02* (2013.01); *F01N 2490/04* (2013.01); *F01N 2490/16* (2013.01); *F01N 2490/18* (2013.01); *F01N 2590/04* (2013.01)

(58) Field of Classification Search
CPC ..... F01N 1/089; F01N 3/2882; F01N 3/2885; F01N 2490/16; F01N 2490/18; F01N 2590/04

USPC ..................................... 60/299; 181/227, 228
See application file for complete search history.

(56) References Cited

U.S. PATENT DOCUMENTS

| 2005/0082113 A1* | 4/2005 | Okunosono ........... F01N 13/005 181/227 |
| 2006/0201742 A1* | 9/2006 | Terashima ............. B62K 19/30 181/227 |
| 2006/0242952 A1* | 11/2006 | Muramatsu ............. F01N 1/003 60/299 |
| 2007/0107419 A1* | 5/2007 | Taniguchi ............... F01N 1/084 60/299 |

(Continued)

FOREIGN PATENT DOCUMENTS

| JP | 10026016 A | * 1/1998 |
| JP | 2007534483 A | * 11/2007 |

(Continued)

*Primary Examiner* — Jeremy Luks
(74) *Attorney, Agent, or Firm* — Rankin, Hill & Clark LLP

(57) ABSTRACT

An exhaust system for a motorcycle having a catalyzer casing that is accommodated in an exhaust muffler. The exhaust muffler is provided at opposite sides thereof in the vehicle width direction with lateral walls that are inclined so as to come closer to each other as they extend downward. A bent section is formed in an intermediate portion, within the exhaust muffler, of an exhaust gas conduit passing through a front end wall of the exhaust muffler and changes the flow direction of exhaust gas from the forward and rearward direction of the vehicle to the vehicle width direction. The catalyzer casing has one end connected to a downstream end portion of the exhaust gas conduit and is arranged in an inclined condition to be lowered as it approaches one side of the muffler in the vehicle width direction.

19 Claims, 6 Drawing Sheets

(56) References Cited

U.S. PATENT DOCUMENTS

| | | | | |
|---|---|---|---|---|
| 2008/0110155 A1* | 5/2008 | Harada | ............... | F01N 1/08 60/276 |
| 2009/0114477 A1* | 5/2009 | Nishijima | ............... | F01N 1/084 181/272 |
| 2009/0166115 A1* | 7/2009 | Mizutani | ............... | B62H 1/04 180/68.3 |
| 2012/0210701 A1* | 8/2012 | Usa | ............... | F01N 1/089 60/297 |
| 2013/0087405 A1* | 4/2013 | Uchino | ............... | F01N 13/082 181/228 |
| 2013/0255238 A1* | 10/2013 | Murakami | ............... | F01N 3/2842 60/299 |
| 2014/0060963 A1* | 3/2014 | Ono | ............... | F01N 1/089 181/228 |

FOREIGN PATENT DOCUMENTS

| | | | |
|---|---|---|---|
| JP | 2007-321610 | | 12/2007 |
| JP | 2010064572 A | * | 3/2010 |
| JP | 2010065580 A | * | 3/2010 |
| JP | 2012102663 A | * | 5/2012 |
| JP | 2013231384 A | * | 11/2013 |
| KR | 1020090097356 A | * | 9/2009 |

* cited by examiner

EXHAUST SYSTEM FOR MOTORCYCLE

BACKGROUND OF THE INVENTION

1. Field of the Invention

The present invention relates to an exhaust system for a motorcycle in which exhaust gas discharged from a cylinder head of an engine main body mounted on a vehicle body frame is conducted into an exhaust muffler arranged to the rear and below the engine main body, and in which a cylindrically-shaped catalyzer casing that retains a catalyzer is accommodated in the exhaust muffler.

2. Description of Related Art

An exhaust system in which a catalyzer directed in the vehicle width direction is accommodated within an exhaust muffler is already known, and is disclosed in Japanese Patent No. 4727503, for example.

In the exhaust system set forth in Japanese Patent No. 4727503, a space within the exhaust muffler is used effectively to make it possible to increase a capacity of the catalyzer. However, since an exhaust gas conduit tube for introducing the exhaust gas into the exhaust muffler is connected to one side in the vehicle width direction of the exhaust muffler, the exhaust system as a whole increases in size in the vehicle width direction and, as such, is disadvantageous in ensuring a bank angle.

SUMMARY OF THE INVENTION

The present invention has been made in consideration of the above described circumstances, and is directed toward providing an exhaust system for a motorcycle that makes it easy to ensure a bank angle of the motorcycle and that ensures a capacity of a catalyzer and the flow length of the exhaust gas to thereby improve a purification performance.

In accordance with a first aspect of the invention, there is provided an exhaust system for a motorcycle in which exhaust gas discharged from a cylinder head of an engine main body mounted on a vehicle body frame is conducted into an exhaust muffler arranged to the rear of and below the engine main body, and a catalyzer casing of cylindrical shape retaining a catalyzer is accommodated in the exhaust muffler. The exhaust muffler is provided at opposite sides thereof in the vehicle width direction with a pair of lateral walls. The lateral walls are inclined so as to come closer to each other as they extend downward. The exhaust muffler is formed in the shape of an inverted trapezoid in an elevational view as seen from the rear side in a forward and rearward direction of a vehicle. An exhaust gas conduit passes through a front end wall of the exhaust muffler so as to conduct exhaust gas. A bent section is formed in an intermediate portion of the exhaust gas conduit within the exhaust muffler and changes a flow direction of the exhaust gas in the exhaust gas conduit from the forward and rearward direction of the vehicle to the vehicle width direction. A catalyzer casing has one end connected to a downstream end portion of the exhaust gas conduit within the exhaust muffler and is arranged in an inclined condition to be lowered as approaching one side in the vehicle width direction. With this construction, it is possible to make it easy to ensure a bank angle of the motorcycle, and the capacity of the catalyzer and the flow length of the exhaust gas can be ensured to thereby improve the purification performance.

According to another aspect of the present invention, a tail pipe for discharging the exhaust gas from the exhaust muffler is joined to a rear upper part of the exhaust muffler on one side in the vehicle width direction, and the exhaust gas conduit is arranged on the other side in the vehicle width direction so as to pass through an upper part of the front end wall. Accordingly, the flow length of the exhaust gas is greatly extended within the exhaust muffler whereby the adjustment is easily carried out so as to improve output characteristics of the engine.

In accordance with another aspect of the present invention, the catalyzer casing has an elliptical transverse cross sectional configuration, a longitudinal axis of which extends in the forward and rearward direction of the vehicle, and is formed flat in the upward and downward direction. Therefore, even if the cross sectional area of the catalyzer casing is increased so as to ensure the capacity of the catalyzer, it is possible to ensure a distance between the bottom of the exhaust muffler and the ground while avoiding the enlargement in the upward and downward direction of the exhaust muffler, and thereby contributes to ensuring the bank angle of the motorcycle.

According to another aspect of the present invention, the catalyzer casing is supported by a support that is fixed on the exhaust muffler. The support is configured to allow the exhaust gas to flow above and below the catalyzer casing. Therefore, an external form of the exhaust muffler can be made compact and the capacity of the exhaust muffler can be ensured.

In accordance with another aspect of the invention, the exhaust muffler includes a first expansion chamber in which the catalyzer casing is accommodated and a second expansion chamber that is arranged in the rear of the first expansion chamber and offset to one side in the vehicle width direction. The second expansion chamber is in communication with the first expansion chamber through a communicating tube, and a side stand, which comes into contact with the ground in a standing position thereof, is arranged on the other side of the second expansion chamber in the vehicle width direction such that, in a side view, at least a portion of the side stand overlaps with the second expansion chamber when being in the standing position. Therefore, the exhaust muffler can be made compact in the forward and rearward direction of the vehicle and the capacity of the exhaust muffler can be ensured.

In accordance with another aspect of the invention, a rear end wall of the exhaust muffler forms a rear end of the second expansion chamber and is inclined forwardly and upwardly, and at least a rear part of the communicating tube is configured to be inclined rearwardly and downwardly. Therefore, the flow length of the exhaust gas can be made longer while extending the communicating tube so as to increase a flow speed of the exhaust gas.

In accordance with another aspect of the invention, a tail pipe for discharging the exhaust gas from the second expansion chamber is connected to a rear upper part of the exhaust muffler in such a way as to communicate with an upper part of the second expansion chamber. Therefore, the exhaust muffler can be made compact in the forward and rearward direction of the vehicle whereby the concentration of mass can be achieved.

In accordance with another aspect of the invention, within the second expansion chamber, a rear end of the communicating tube is arranged in the rear of a communicating portion of the tail pipe to the second expansion chamber. Therefore, the exhaust gas flowing out of the communicating tube within the second expansion chamber flows so as to turn around upwardly in a circular arc shape along the rear end wall, whereby the volume of the second expansion chamber can be evenly and effectively used.

BRIEF DESCRIPTION OF THE DRAWINGS

These and further features of the invention will be apparent with reference to the following description and drawings, wherein.

DETAILED DESCRIPTION OF THE INVENTION

An embodiment of the present invention will be described hereunder with reference to FIGS. 1-6. In the following description, the orientation such as "front", "rear", "left", "right", "upper" and "lower" shall be determined with reference to a rider riding on a motorcycle.

Figure 1:
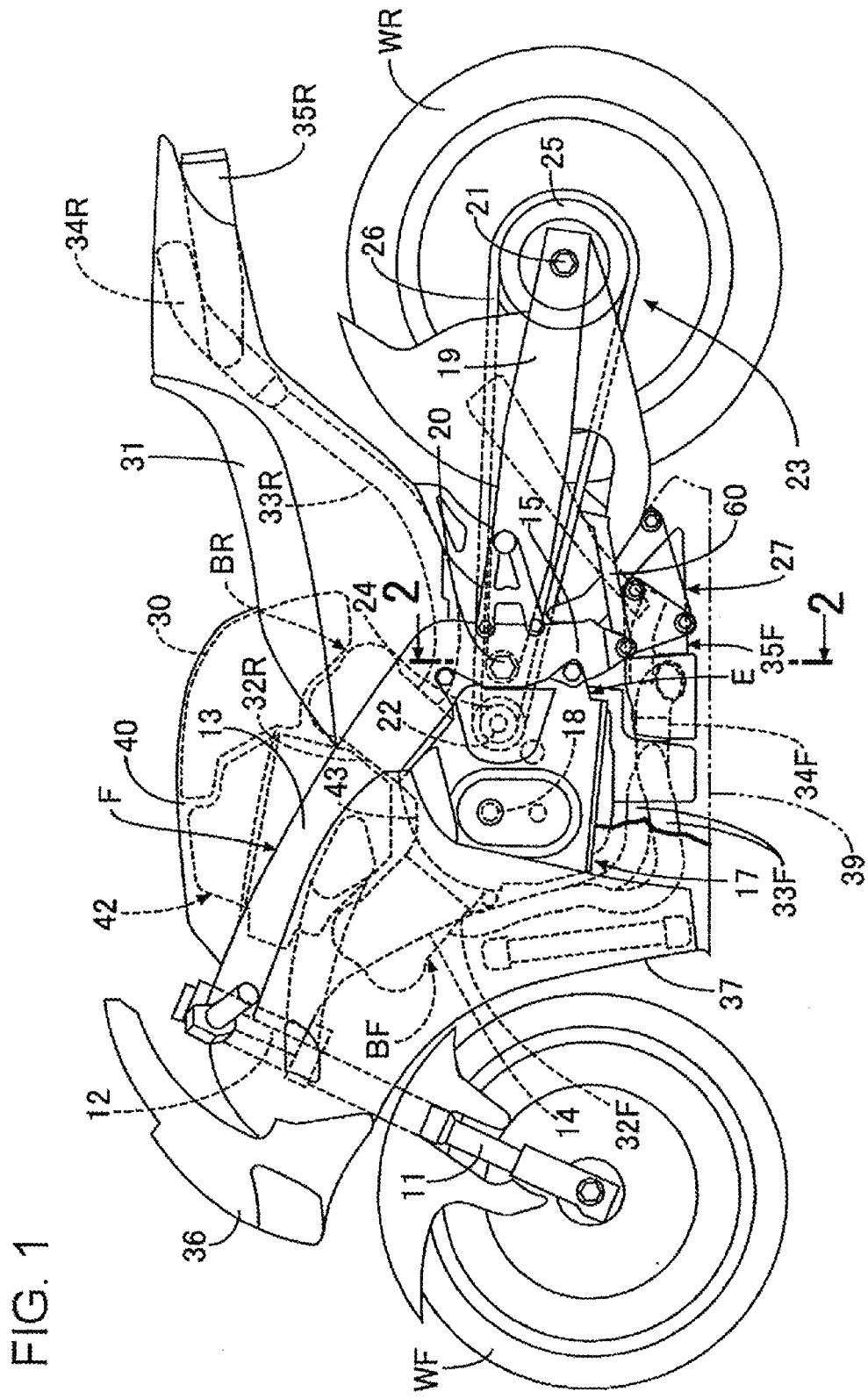
FIG. 1 is a left side elevational view of a motorcycle.
Figure 2:
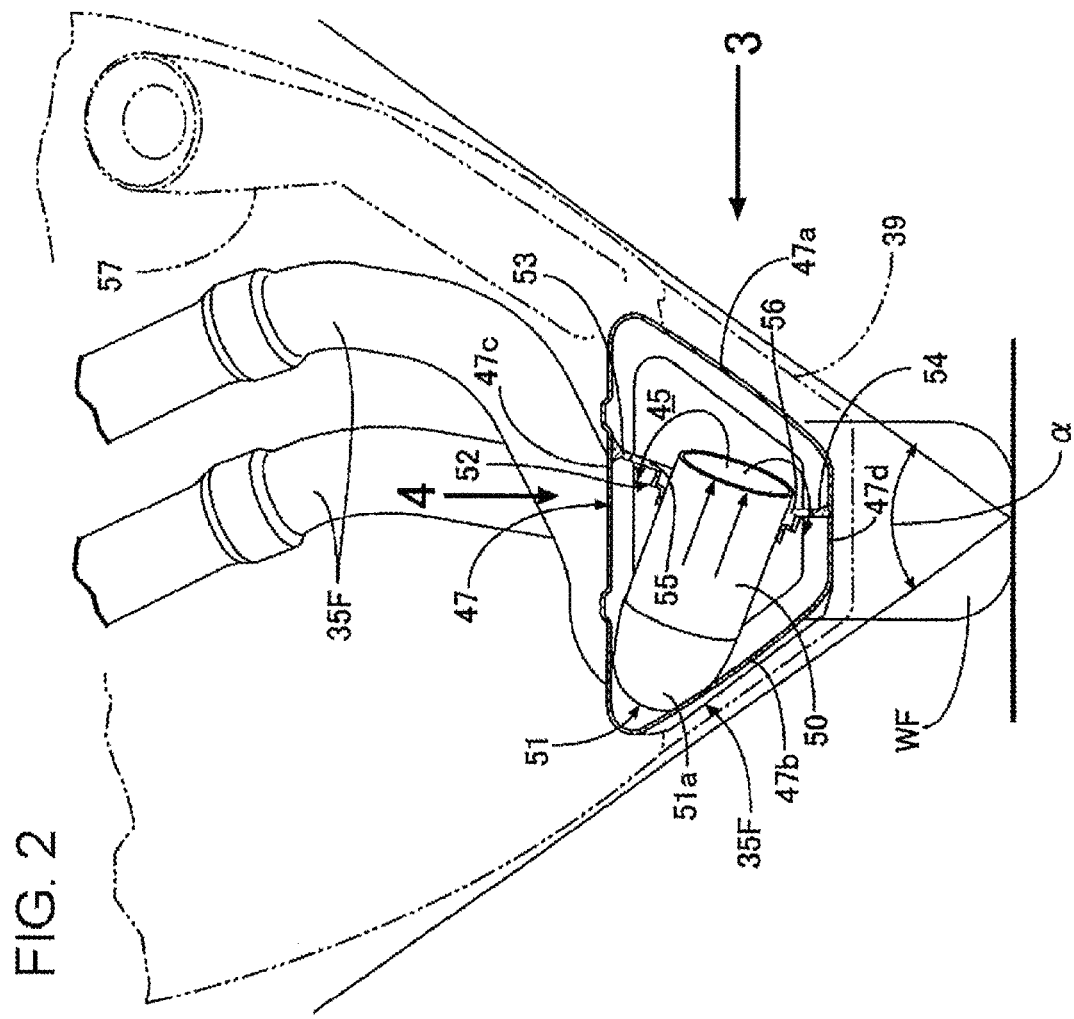
FIG. 2 is a cross sectional view taken on line 2-2 of FIG. 1.

Referring first to FIG. 1, a vehicle body frame F of a two-wheeled motorcycle of a straddle type vehicle includes a front fork 11 pivotally carrying a front wheel WF, a head pipe 12 supporting the front fork 11 in a steerable manner, left and right main frames 13 extending from the head pipe 12 downwardly to the rear, left and right engine hangers 14 being welded to the head pipe 12 and each of the main frames 13 and extending downwardly from the main frames 13, and left and right pivot frames 15 extending downwardly from each rear part of the main frames 13.

On the vehicle body frame F, there is carried an engine body 17 of a four cylinder V-type engine E, for example. In this embodiment, the engine body 17 pivotally supports a crankshaft 18, which extends in the vehicle width direction, and is supported by each lower portion of the pair of engine hangers 14, each intermediate portion of the main frames 13, and upper and lower portions of the pivot frames 15. The illustrated engine main body 17 has a front bank BF and a rear bank BR that are arranged in a V-shape in such a manner that the cylinders of each pair stand side by side in an axial direction of the crankshaft 18.

A front end portion of a swing arm 19 is pivotally supported through a pivot shaft 20 in a swingable manner on each intermediate portion in the upward and downward direction of the pivot frames 15. On a rear end portion of the swing arm 19, an axle 21 of a rear wheel WR is supported in a rotatable manner.

The motive power from an output shaft 22 of a transmission accommodated within the engine main body 17 is transmitted through a chain drive assembly 23 to the rear wheel WR. The chain drive assembly 23 includes a drive sprocket 24 that is fixed on the output shaft 22, a driven sprocket 25 that is fixed on the axle 21 of the rear wheel WR, and an endless chain 26 that is wrapped around the drive and driven sprockets 24 and 25.

A front part of the swing arm 19 is connected through a link mechanism 27 to each lower portion of the pivot frames 15. A rear cushion unit (not shown) is provided between a member constituting a component of the link mechanism 27 and the rear part of the main frame 13.

Above the rear bank BR of the engine main body, there is arranged a fuel tank 30 in such a way as to be supported by the main frame 13. A rider's seat 31, which is arranged to the rear of the fuel tank 30, is supported by a rear part of the vehicle body frame F.

A pair of separated exhaust pipes 33F on the front bank side are connected to each of cylinders of the cylinder head 32F of the front bank BF of the engine main body 17. The pair of separated exhaust pipes 33F pass through the under side of the engine main body 17 and extend rearwardly to thereby be joined in common to a collecting exhaust pipe 34F. The collecting exhaust pipe 34F is joined to an exhaust muffler 35F, which is located to the rear of and under the engine main body 17.

A pair of separated exhaust pipes 33R on the rear bank side are connected to each cylinder of the cylinder head 32R of the rear bank BR of the engine main body 17 and extend rearwardly. The pair of separated exhaust pipes 33R are connected to a collecting exhaust pipe 34R to the rear of the rider's seat 31. The collecting exhaust pipe 34 R on the rear bank side is joined to an exhaust muffler 35R, which is located above the rear wheel WR.

The head pipe 12 of the vehicle body frame F is covered with a front cowling 36 from the forward direction thereof. The front part of the vehicle body frame F and a part of the engine main body 17 are covered with left and right of center cowlings 37 from each lateral side. The rear part of the vehicle body frame F, the separated exhaust pipes 33R on the rear bank side, the collecting exhaust pipe 34R on the rear bank side and the exhaust muffler 35 R on the rear bank side are covered with a rear cowling 38, while allowing the rear part of the exhaust muffler 35R on the rear bank side to project rearwardly. In addition, a portion of the separated exhaust pipes 35F on the front bank side, the collecting exhaust pipe 34F on the front bank side and the exhaust muffler 35F on the front bank side are covered from the under side and each lateral side with an under cowling 39, a front end part of which is continuously connected to a lower part of the center cowling 37.

Above the engine main body 17 and forwardly of the fuel tank 30 there is arranged an air cleaner 42, which is common to the front bank BF and the rear bank BR. The air cleaner 42, a part of which is accommodated in a valley 43 between the front bank BF and the rear bank BR, is located between the left and right main frames 13 and covered with a cover 40 together with the fuel tank 30.

Referring to FIGS. 2-6 together, the exhaust muffler 35F on the front bank side is constituted in accordance with the present invention and includes a first casing 47 forming a first expansion chamber 45, and a second casing 48 forming a second expansion chamber 46, which is smaller in volume than the first expansion chamber 45 and is provided continuous with a rear part of the first casing 47.

The first casing 47 comprises a first right lateral wall 47a being inclined in such a way as to be located inwardly in the vehicle width direction as the first right lateral wall extends downward, a first left lateral wall 47b being inclined in such a way as to come closer to the first right lateral wall 47a as the first left lateral wall extends downward, a first ceiling wall 47c providing a connection between upper end portions of the first right lateral wall 47a and the first left lateral wall 47b, a first bottom wall 47d providing a connection between lower end portions of the first left lateral wall 47b and the first right lateral wall 47a, a front end wall 47e connecting each of front end portions of the first left lateral wall 47b, the first right lateral wall 47a, the first ceiling wall 47c and the first bottom wall 47d, and a first rear end wall 47f connecting each of rear end portions of the first left lateral wall 47b, the first right lateral wall 47a, the first ceiling wall 47c and the first bottom wall 47d.

The second casing 48 is provided continuous with a rear part of the first casing 47 such that the first rear end wall 47f of the first casing 47 serves as a front end wall of the second expansion chamber 46, and is offset to one side (the right side in this embodiment) in the vehicle width direction to thereby be continuously connected to the rear part of the first casing 47. The second casing 48 comprises a second right lateral wall 48a, which is inclined so as to be located inwardly in the vehicle width direction as the second right lateral wall 48a extends downward in a position to substantially overlap with the first right lateral wall 47a of the first casing 47 when viewed from the rear side in the forward and rearward direction of the vehicle, a second left lateral wall 48b being opposed to the second right lateral wall 48a from the inside in the vehicle width direction and extending in substantially the upward and downward direction, a second ceiling wall 48c providing a connection between upper end portions of the second right lateral wall 48a and the second left lateral wall 48b such that a part thereof substantially overlaps with the first ceiling wall 47c of the first casing 47 when viewed from the rear side in the forward and rearward direction of the vehicle, a second bottom wall 48d providing a connection between lower end portions of the second right lateral wall 48a and the second left lateral wall 48b so as to substantially overlap with the first bottom wall 47d of the first casing 47 when viewed from the rear side in the forward and rearward direction of the vehicle, the first rear end wall 47f connecting in common each of front end portions of the second right lateral wall 48a, the second left lateral wall 48b, the second ceiling wall 48c and the second bottom wall 48d, and a second rear end wall 48e connecting in common each of rear end portions of the second right lateral wall 48a, the second left lateral wall 48b, the second ceiling wall 48c and the second bottom wall 48d.

When the entire exhaust muffler 35F on the front bank side as constructed above is viewed from the rear side in the forward and rearward direction of the vehicle, it has the first and second right lateral walls 47a, 48a, which substantially overlap with each other, on one side in the vehicle width direction and the first left lateral wall 47b on the other side. The first and second right lateral walls 47a, 48a and the first left lateral wall 47b located at opposite sides in the vehicle width direction are inclined so as to come closer to each other as they extend downward, so that the exhaust muffler 35F on the front bank side is formed in the shape of an inverted trapezoid in an elevational view as seen from the rear side in the forward and rearward direction of the vehicle.

Further, the rear end wall of the exhaust muffler 35F on the front bank side, namely, the second rear end wall 48e of the second casing 48, is configured to be inclined forwardly and upwardly while forming the rear end of the second expansion chamber 46.

By the way, within the exhaust muffler 35F on the front bank side, there is accommodated a catalyzer casing 50 that retains a catalyzer 49 and is formed in a cylindrical shape. An end portion of the catalyzer casing 50 is connected to a downstream end portion of an exhaust gas conduit 51, which is joined to the collecting exhaust pipe 34F on the front bank side and passes through the front end wall 47e of the exhaust muffler 35F on the front bank side, namely, the front end wall 47e of the first casing 47.

The exhaust gas conduit 51 passes through the front end wall 47e of the first casing 47 to thereby project into the first expansion chamber 45. In an intermediate part of this exhaust gas conduit 51 within the exhaust muffler 35F on the front bank side, namely, in an intermediate part in the first expansion chamber 45 in this embodiment, there is formed a bent section 51a for changing the flow direction of the exhaust gas within the exhaust gas conduit 51 from the forward and rearward direction of the vehicle to the vehicle width direction.

Further, the catalyzer casing 50, one end of which is connected to a downstream end portion of the exhaust gas conduit 51, within the first expansion chamber 45 of the exhaust muffler on the front bank side is of elliptic transverse cross sectional shape, a longitudinal axis of which is directed in the forward and rearward direction of the vehicle. The catalyzer casing 50 is formed flat in the upward and downward direction and is arranged in such an inclined condition as to be lowered as approaching one side in the vehicle width direction (a right side in this embodiment).

The catalyzer casing 50 is supported by a support 52 that is fixed on the first casing 47 of the exhaust muffler 35F on the front bank side. The support 52 is configured to allow the exhaust gas to flow on the upper and lower sides of the catalyzer casing 50. In this embodiment, the support 52 includes an upper support wall 53, which is fixed to an inner surface of the first ceiling wall 47c of the first casing 47, and a lower support wall 54, which is fixed to an inner surface of the first bottom wall 47d of the first casing 47. The catalyzer casing 50 is supported between a lower part of the upper support wall 53 and an upper part of the lower support wall 54. An opening section 55 for allowing the exhaust gas to flow above the catalyzer casing 50 is provided in the upper support wall 53, while an opening section 56 for allowing the exhaust gas to flow below the catalyzer casing 50 is provided in the lower support wall 54.

A tail pipe 57 for discharging the exhaust gas from the exhaust muffler 35F on the front bank side is joined to a rear upper part of the exhaust muffler 35F on the front bank side on one side (a right side in this embodiment) in the vehicle width direction. In this embodiment, an upstream end portion of the tail pipe 57 communicating with an upper part of the second expansion chamber 46 is joined to a rear part of the second ceiling wall 48c of the second casing 48. The tail pipe 57 is arranged so as to extend upwardly to the rear on the right side of the rear wheel WR. In addition, the tail pipe 57 is covered with a thermally insulating guard member 58 from the outside thereof. The thermally insulating guard member 58 is attached to the pivot frame 15 on the right side.

On the other hand, the exhaust gas conduit 51 is arranged so as to pass through an upper part of the front end wall 47e on the other side (a left side in this embodiment) in the vehicle width direction of the exhaust muffler 35F on the front bank side.

Figure 3:
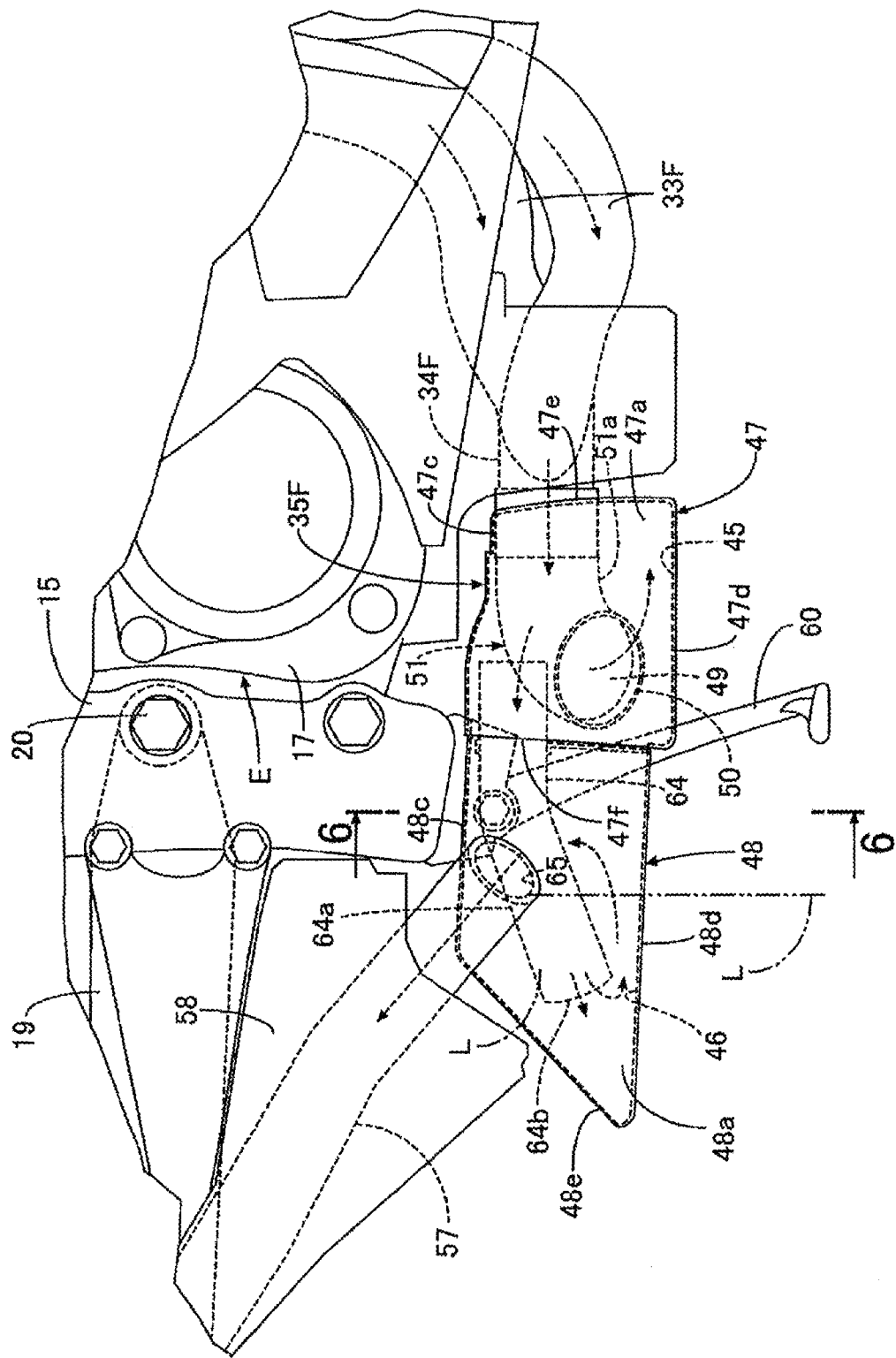
FIG. 3 is a view as seen in the direction of an arrow 3 of FIG. 2.
Figure 4:
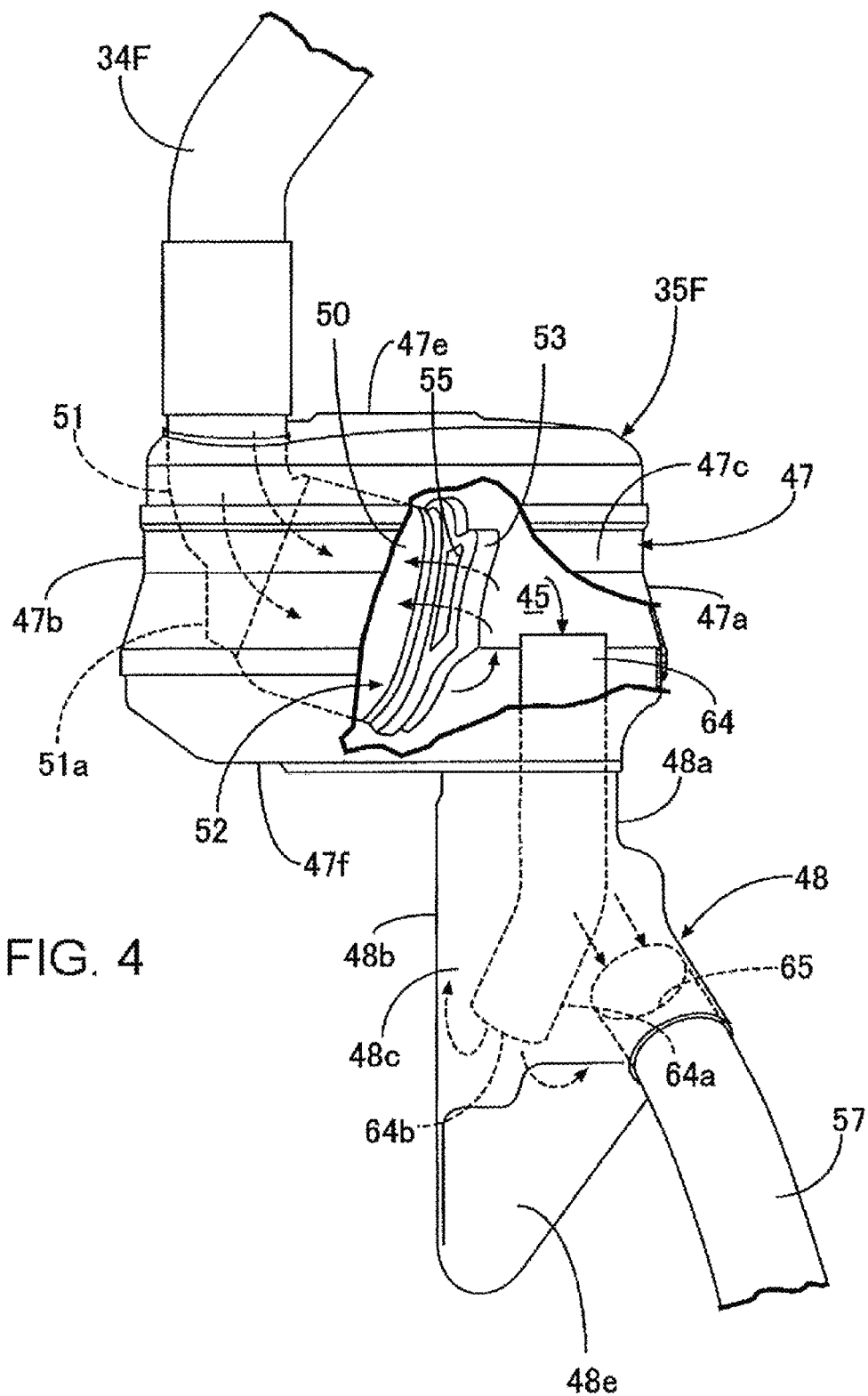
FIG. 4 is a view as seen in the direction of an arrow 4 of FIG. 2.
Figure 5:
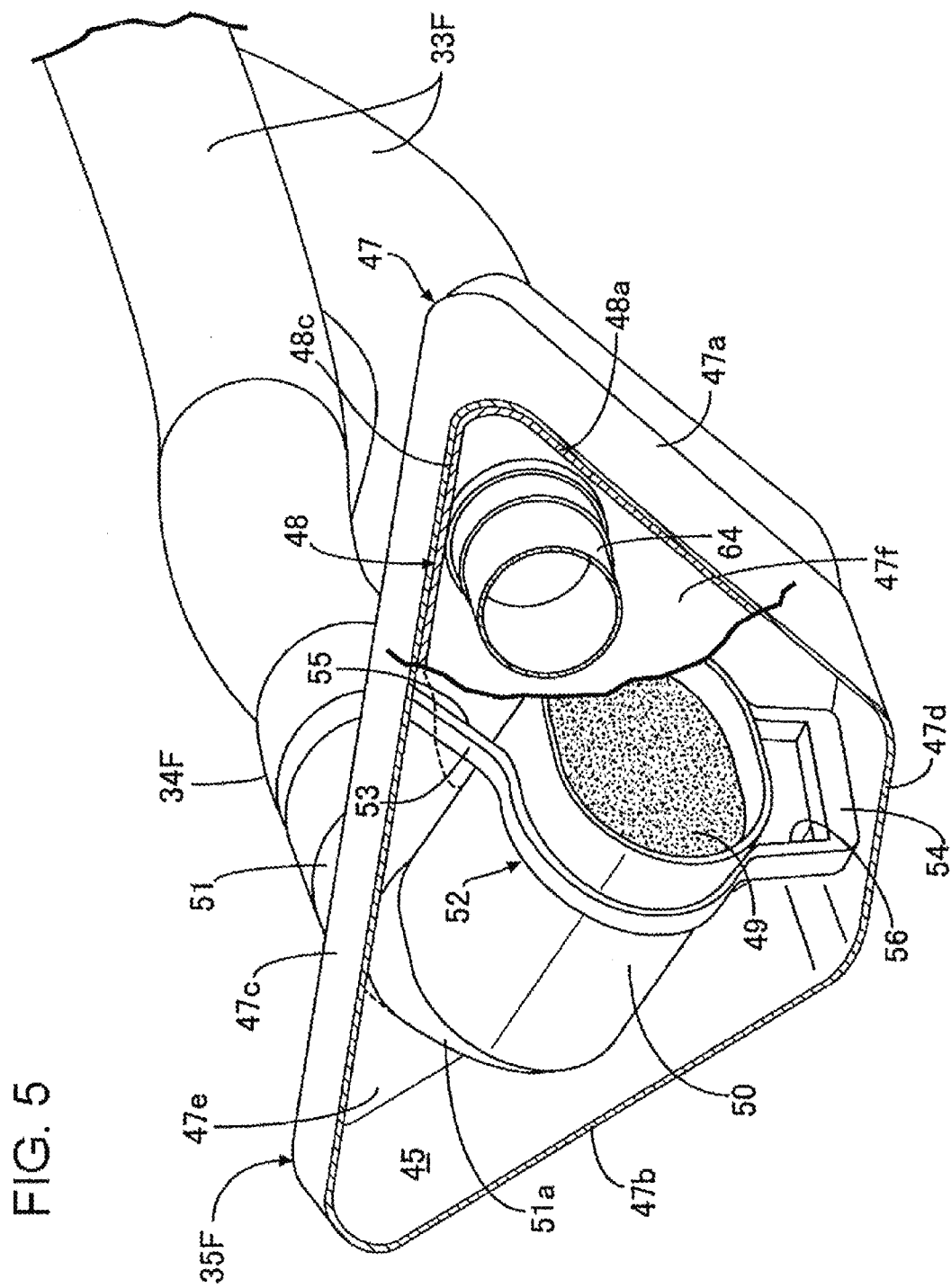
FIG. 5 is a longitudinal cross sectional view of an exhaust muffler on the front bank side when viewed from the rearward side in a right diagonal position.
Figure 6:
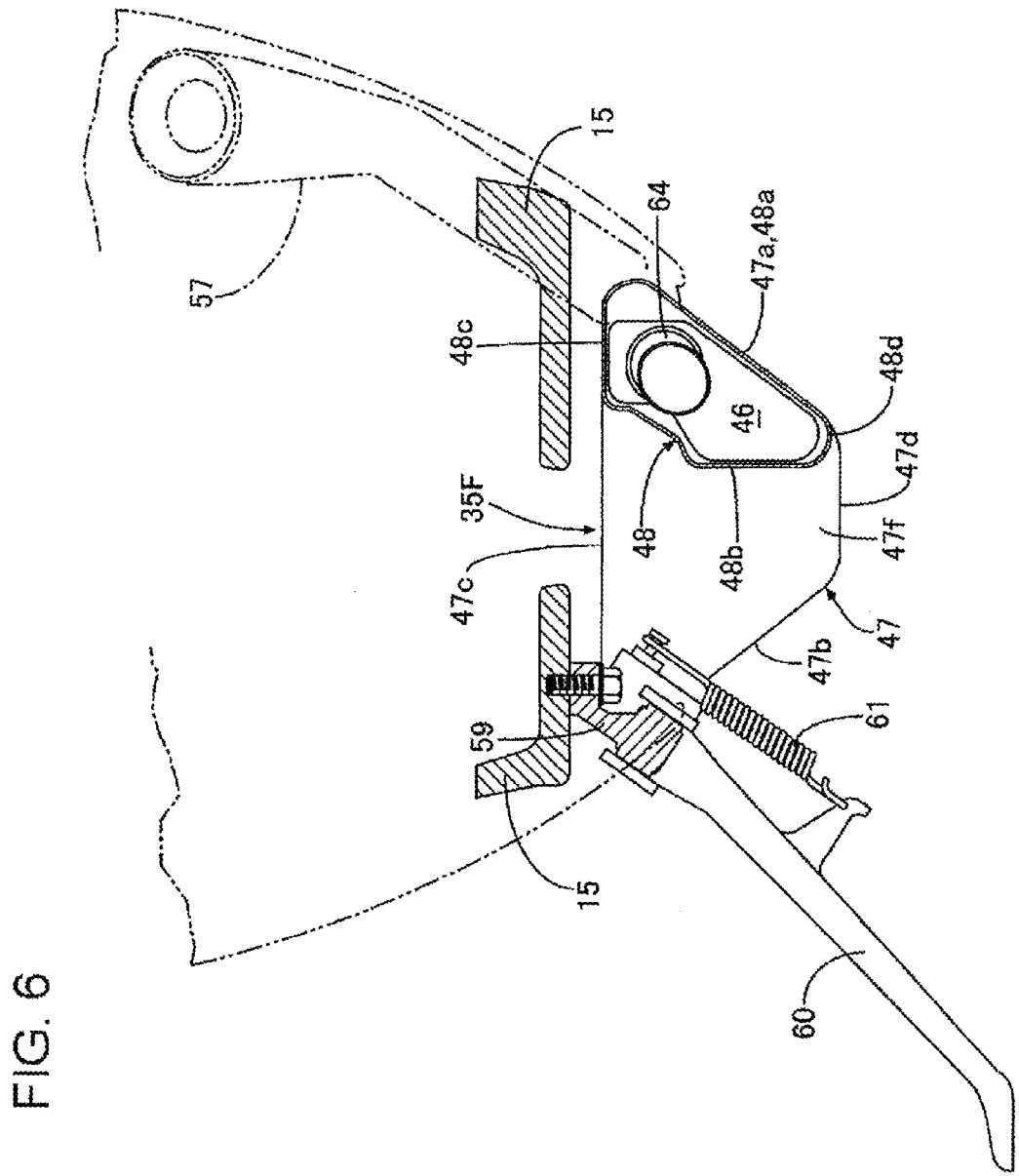
FIG. 6 is a cross sectional view taken on line 6-6 of FIG. 3.

On the support member 59 fixed on the lower portion of the pivot frame 15 on the left side, a side stand 60, which is configured to come into contact with the ground in its standing position, as seen in FIGS. 3 and 6, is supported in a rotatable manner between the standing position and a retracted position (the position as shown in FIG. 1) raised upwardly from the standing position. On the retracted position side, the coil spring 61 for energizing the rotation of the side stand 60 is disposed between the side stand 60 and the support member 59.

The side stand 60 is arranged on the other side (the left side in this embodiment) of the second expansion chamber 46 such that at least a portion of the side stand 60, when in the standing position as shown clearly in FIG. 3, overlaps with the second expansion chamber 46 of the exhaust muffler 35F on the front bank side in a side view.

The first expansion chamber 45 and the second expansion chamber 46 are connected each other through a communicating tube 64, which passes through the first rear end wall 47f of the first casing 47. At least a rear portion (a rear half portion 64a in this embodiment) of the communicating tube 64 is so formed as to be inclined rearwardly and downwardly in a state of a rear end opening portion being opposed to the second rear end wall 48e, which is configured to be inclined forwardly and upwardly while forming the rear end of the second expansion chamber 46.

Further, within the second expansion chamber 46, a rear end 64b of the communicating tube 64 is arranged in the rear of a communicating portion 65 of the tail pipe 57 to the second expansion chamber 46. Namely, as shown in FIG. 3, the rear end 64b of the communicating tube 64 is arranged rearwardly of an imaginary vertical line L extending from a rear end of the communicating portion 65 of the tail pipe 57 relative to the second expansion chamber 46.

The operation of this embodiment will be described hereinafter.

The exhaust muffler 35F on the front bank side has each of the first and second right lateral walls 47a, 48a and the first right lateral wall 47b, which are located at the opposite sides in the vehicle width direction so as to substantially overlap with each other when the whole thereof is viewed from the rear side in the forward and rearward direction. The first and second lateral walls 47a, 48a and the left lateral wall 47b located at the opposite sides in the vehicle width direction are inclined so as to come closer to each other as they extend downward and are formed in the shape of an inverted trapezoid in an elevational view. The bent section 51a for changing the flow direction of the exhaust gas from the forward and rearward direction of the vehicle to the vehicle width direction is formed in the intermediate portion, within the exhaust muffler 35F, of the exhaust gas conduit 51 that passes through the front end wall 47e of the exhaust muffler 35F on the front bank side so as to conduct the exhaust gas. Then, the catalyzer casing 50, which retains the catalyzer 49 and is formed in a cylindrical shape, has one end portion connected to the downstream end portion of the exhaust gas conduit 51 within the exhaust muffler 35F on the front bank side and is arranged in an inclined condition to be lowered as approaching one side (the right side in this embodiment) in the vehicle width direction. With this construction, it is possible to ensure the bank angle α of the motorcycle, and the capacity of the catalyzer and the flow length of the exhaust gas can be ensured to thereby improve the purification performance.

Further, since the tail pipe 57 for discharging the exhaust gas from the exhaust muffler 35F on the front bank side is joined to the rear upper part of the front bank side exhaust muffler 35F on one side (the right side in this embodiment) in the vehicle width direction, and the exhaust gas conduit 51 is arranged on the other side (the left side in this embodiment) in the vehicle width direction so as to pass through the upper part of the front end wall 47e, the flow length of the exhaust gas is endured greatly within the exhaust muffler 35F on the front bank side whereby the adjustment is easily carried out so as to make it possible to improve the output characteristics of the engine E.

The catalyzer casing 50 has an elliptical cross sectional configuration, the longitudinal axis of which extends in the forward and rearward direction of the vehicle. Therefore, even if the cross sectional area of the catalyzer casing 50 is increased in order to ensure the capacity of the catalyzer 50, it is possible to ensure a distance between the bottom, namely, each of the first and second bottom walls 47d, 48d, of the exhaust muffler 35F on the front bank side, and the ground while avoiding the enlargement in the upward and downward direction of the exhaust muffler 35F on the front bank side, thereby ensuring the bank angle α.

Further, since the support 52 that supports the catalyzer casing 50 and is fixed on the exhaust muffler 35F on the front side is configured to allow the exhaust gas to flow above and below the catalyzer casing 50, an external form of the exhaust muffler 35F on the front bank side can be made compact and the capacity of the exhaust muffler 35F on the front bank side can be ensured.

Moreover, the exhaust muffler 35F on the front bank side includes the first expansion chamber 45 in which the catalyzer casing 50 is accommodated and the second expansion chamber 46, which is arranged in the rear of the first expansion chamber 45 in a state of being offset to one side in the vehicle width direction and which is in communication through the communicating tube 64 with the first expansion chamber 45. The side stand 60, which comes into contact with the ground in the standing position thereof, is arranged on the other side (the left side in this embodiment) of the second expansion chamber 46 in the vehicle width direction such that at least a portion of the side stand 60 overlaps with the second expansion chamber 46 in the standing position in a side view. Therefore, the side stand 60 and the second expansion chamber 46 can be arranged side by side in the vehicle width direction, and the capacity of the exhaust muffler 35F can be ensured, while compactly arranging the exhaust muffler 35F on the front bank side in the forward and rearward direction of the vehicle.

Further, the rear end wall of the exhaust muffler 35F on the front bank side, namely, the second rear end wall 48e of the second casing 48, forms the rear end of the second expansion chamber 46 and is inclined forwardly and upwardly, and at least the rear part of the communicating tube 46 is configured to be inclined rearwardly and downwardly. Therefore, the flow length of the exhaust gas can be made longer while extending the communicating tube 64 whereby to increase flow speed of the exhaust gas.

Further, since the tail pipe 57, which discharges the exhaust gas from the second expansion chamber 46, is joined to the rear upper part of the exhaust muffler 35F on the front bank side in a state of communicating with the upper part of the second expansion chamber 46, the exhaust muffler 35F on the front bank side can be made compact in the forward and rearward direction of the vehicle whereby the concentration of mass can be achieved.

In addition, since the rear end 64b of the communicating tube 64 is arranged, within the second expansion chamber 46, in the rear of the communicating portion 65 of the tail pipe 57 to the second expansion chamber 46, the exhaust gas flowing out of the communicating tube 64 within the second expansion chamber 46 flows so as to turn around upwardly in a circular arc shape along the rear end wall 48e, whereby the volume of the second expansion chamber 46 can be effectively used evenly.

While a preferred embodiment of the present invention has been described, the present invention is not limited to the above described embodiment, and various design changes and modifications may be made without departing from the spirit and scope of the present invention as defined in the appended claims.

DESCRIPTION OF REFERENCE CHARACTERS

17: Engine main body, 32F: Cylinder head on the front bank side as a cylinder head, 35F: Exhaust muffler on the front bank side as an exhaust muffler, 45: First expansion chamber, 46: Second expansion chamber, 47a, 47b, 48a: Lateral wall, 47e: Front end wall, 48e: Second rear end wall as a rear end wall of the exhaust muffler, 49: Catalyzer, 50: Catalyzer casing, 51: Exhaust gas conduit, 51a:Bent section, 52: Support means, 57: Tail pipe, 60: Side stand, 64: Communicating tube 64b: Rear end of the communicating tube, 65: Communicating portion, F: Vehicle body frame

What is claimed is:

1. An exhaust system for a motorcycle in which exhaust gas discharged from a cylinder head of an engine main body mounted on a vehicle body frame is conducted into an exhaust muffler arranged to a rear of and below the engine main body, and a cylindrically-shaped catalyzer casing retaining a catalyzer is accommodated in the exhaust muffler, comprising:

the exhaust muffler being provided at opposite sides thereof in the vehicle width direction with lateral walls, said lateral walls being inclined such that the lateral walls come closer to one another as the lateral walls extend downwardly, said exhaust muffler being shaped as an inverted trapezoid in an elevational view as seen from the rear side in a forward and rearward direction of a vehicle, an exhaust gas conduit passing through a front end wall of the exhaust muffler so as to conduct the exhaust gas, said exhaust gas conduit having an intermediate portion that includes a bent section within the exhaust muffler and serving to change a flow direction of the exhaust gas in the exhaust gas conduit from the forward and rearward direction of the vehicle to the vehicle width direction, and a catalyzer casing having one end connected to a downstream end portion of the exhaust gas conduit within the exhaust muffler and being arranged in an inclined condition so as to be lowered as said catalyzer casing approaches a side of said exhaust muffler in the vehicle width direction.

2. An exhaust system for a motorcycle according to claim 1, further comprising a tail pipe for discharging the exhaust gas from the exhaust muffler, wherein the tail pipe is joined to a rear upper part of the exhaust muffler on one side of the exhaust muffler in the vehicle width direction, and the exhaust gas conduit is arranged on the other side of the muffler in the vehicle width direction so as to pass through an upper part of the front end wall.

3. An exhaust system for a motorcycle according to claim 1, wherein the catalyzer casing has an elliptical transverse cross sectional configuration, a longitudinal axis of which extends in the forward and rearward direction of the vehicle, and is formed flat in the upward and downward direction.

4. An exhaust system for a motorcycle according to claim 1, wherein the catalyzer casing is supported by a support, said support being fixed on the exhaust muffler, wherein the support is configured to allow the exhaust gas to flow above and below the catalyzer casing.

5. An exhaust system for a motorcycle according to claim 1, wherein the exhaust muffler includes a first expansion chamber in which the catalyzer casing is accommodated and a second expansion chamber which is arranged to a rear of the first expansion chamber and offset to one side in the vehicle width direction, said second expansion chamber being in communication through a communicating tube with the first expansion chamber, and wherein a side stand, which comes into contact with the ground in a standing position thereof, is arranged on the other side of the second expansion chamber in the vehicle width direction such that, in a side view, at least a portion of the side stand overlaps with the second expansion chamber when being in the standing position.

6. An exhaust system for a motorcycle according to claim 5, wherein a rear end wall of the exhaust muffler forms a rear end of the second expansion chamber and is inclined forwardly and upwardly, and at least a rear part of the communicating tube is configured to be inclined rearwardly and downwardly.

7. An exhaust system for a motorcycle according to claim 5, wherein a tail pipe for discharging the exhaust gas from the second expansion chamber is connected to a rear upper part of the exhaust muffler so as to communicate with an upper part of the second expansion chamber.

8. An exhaust system for a motorcycle according to claim 7, wherein, within the second expansion chamber, a rear end of the communicating tube is arranged in the rear of a communicating portion of the tail pipe to the second expansion chamber.

9. An exhaust system for a motorcycle according to claim 2, wherein the catalyzer casing has an elliptical transverse cross sectional configuration, a longitudinal axis of which extends in the forward and rearward direction of the vehicle, and is formed flat in the upward and downward direction.

10. An exhaust system for a motorcycle according to claim 2, wherein the catalyzer casing is supported by a support, said support being fixed on the exhaust muffler, wherein the support is configured to allow the exhaust gas to flow above and below the catalyzer casing.

11. An exhaust system for a motorcycle according to claim 3, wherein the catalyzer casing is supported by a support, said support being fixed on the exhaust muffler, wherein the support is configured to allow the exhaust gas to flow above and below the catalyzer casing.

12. An exhaust system for a motorcycle according to claim 2, wherein the exhaust muffler includes a first expansion chamber in which the catalyzer casing is accommodated and a second expansion chamber which is arranged to a rear of the first expansion chamber and offset to one side in the vehicle width direction, said second expansion chamber being in communication through a communicating tube with the first expansion chamber, and wherein a side stand, which comes into contact with the ground in a standing position thereof, is arranged on the other side of the second expansion chamber in the vehicle width direction such that, in a side view, at least a portion of the side stand overlaps with the second expansion chamber when being in the standing position.

13. An exhaust system for a motorcycle according to claim 12, wherein a rear end wall of the exhaust muffler forms a rear end of the second expansion chamber and is inclined forwardly and upwardly, and at least a rear part of the communicating tube is configured to be inclined rearwardly and downwardly.

14. An exhaust system for a motorcycle according to claim 12, wherein a tail pipe for discharging the exhaust gas from the second expansion chamber is connected to a rear upper part of the exhaust muffler so as to communicate with an upper part of the second expansion chamber.

15. An exhaust system for a motorcycle according to claim 14, wherein, within the second expansion chamber, a rear end of the communicating tube is arranged in the rear of a communicating portion of the tail pipe to the second expansion chamber.

16. An exhaust system for a motorcycle according to claim 3, wherein the exhaust muffler includes a first expansion chamber in which the catalyzer casing is accommodated and a second expansion chamber which is arranged to a rear of the first expansion chamber and offset to one side in the vehicle width direction, said second expansion chamber being in communication through a communicating tube with the first expansion chamber, and wherein a side stand, which comes into contact with the ground in a standing position thereof, is arranged on the other side of the second expansion chamber in the vehicle width direction such that, in a side view, at least a portion of the side stand overlaps with the second expansion chamber when being in the standing position.

17. An exhaust system for a motorcycle according to claim 16, wherein a rear end wall of the exhaust muffler forms a rear end of the second expansion chamber and is inclined forwardly and upwardly, and at least a rear part of the communicating tube is configured to be inclined rearwardly and downwardly.

18. An exhaust system for a motorcycle according to claim 16, wherein a tail pipe for discharging the exhaust gas from the second expansion chamber is connected to a rear upper part of the exhaust muffler so as to communicate with an upper part of the second expansion chamber.

19. An exhaust system for a motorcycle according to claim 18, wherein, within the second expansion chamber, a rear end of the communicating tube is arranged in the rear of a communicating portion of the tail pipe to the second expansion chamber.

\* \* \* \* \*